United States Patent
Amano et al.

(10) Patent No.: US 9,977,463 B2
(45) Date of Patent: May 22, 2018

(54) ELECTRONIC DEVICE HAVING A MEMBER FOR CHASSIS

(71) Applicant: LENOVO (SINGAPORE) PTE. LTD., Singapore (SG)

(72) Inventors: Masayuki Amano, Kanagawa-ken (JP); Seita Horikoshi, Kanagawa-ken (JP); Ryota Nohara, Kanagawa-ken (JP); Takehito Yamauchi, Kanagawa-ken (JP)

(73) Assignee: LENOVO (SINGAPORE) PTD LTE, Singapore (SG)

( * ) Notice: Subject to any disclaimer, the term of this patent is extended or adjusted under 35 U.S.C. 154(b) by 0 days. days.

(21) Appl. No.: 15/248,699

(22) Filed: Aug. 26, 2016

(65) Prior Publication Data

US 2017/0060187 A1    Mar. 2, 2017

(30) Foreign Application Priority Data

Aug. 26, 2015  (JP) .................................. 2015-167140

(51) Int. Cl.
G06F 1/16    (2006.01)
H04M 1/02    (2006.01)

(52) U.S. Cl.
CPC ........ *G06F 1/1633* (2013.01); *H04M 1/0249* (2013.01); *G06F 1/1616* (2013.01); *G06F 1/1637* (2013.01)

(58) Field of Classification Search
CPC .... G06F 1/1656; G06F 1/1626; G06F 1/1633; G06F 1/1616; G06F 1/1637; G06F 1/1613; G06F 1/1683; H04M 1/0249; H04M 1/18; H04M 1/185

USPC .................................................... 361/679.26
See application file for complete search history.

(56) References Cited

U.S. PATENT DOCUMENTS 2,760,400 A * 8/1956 Mills .................... F16B 43/001
                                                    411/371.1

FOREIGN PATENT DOCUMENTS

| JP | 55-129636 | 10/1980 | |
|----|-----------|---------|---|
| JP | 9-32192 | 2/1997 | |
| JP | 2001-262811 A | 9/2001 | |
| JP | 2002118371 A * | 4/2002 | |
| JP | 2013-232052 A | 11/2013 | |
| JP | 2013232052 A * | 11/2013 | ............... H05K 5/02 |
| JP | 2014-39033 A | 2/2014 | |

* cited by examiner

*Primary Examiner* — Jinhee Lee
*Assistant Examiner* — Ingrid Wright
(74) *Attorney, Agent, or Firm* — Antony P. Ng; Russell Ng PLLC

(57) ABSTRACT

An electronic device having a member for chassis is disclosed. The member for chassis includes a surface layer, a rear layer disposed inside of the surface layer in a thickness direction, and an intermediate layer disposed between the surface layer and the rear layer. Each of the surface layer and the rear layer includes a fiber-reinforced resin plate. The intermediate layer is made of a material that is compressible in the thickness direction. The member for chassis further includes a fastening hole that penetrates through the surface layer, the intermediate layer and the rear layer, through which a fastener passes to fix the member for chassis to a member for attachment. The surface layer includes a cut line having a larger diameter than the fastening hole in order to surround the fastening hole.

12 Claims, 5 Drawing Sheets

ELECTRONIC DEVICE HAVING A MEMBER FOR CHASSIS

PRIORITY CLAIM

The present application claims benefit of priority under 35 U.S.C. § 120, 365 to the previously filed Japanese Patent Application No. JP2015-167140 with a priority date of Aug. 26, 2015, which is incorporated by reference herein.

BACKGROUND OF THE INVENTION

1. Technical Field

The present invention relates to electronic devices in general, and particularly to a member for chassis used in an electronic device.

2. Description of Related Art

Chassis of various types of electronic devices, such as a laptop personal computer (laptop PC), a tablet personal computer (tablet PC), a smartphone, and a mobile phone are required to be lightweight and thin but with high strength. Thus, a sheet-like member that includes a prepreg plate containing reinforcement fibers, such as carbon fibers, impregnated with thermosetting resin, such as epoxy resin (a fiber-reinforced resin plate) and an intermediate layer made of a foam material, for example, sandwiched therein is widely employed as electronic device chassis.

When such a member for chassis is fastened and fixed to a member for attachment by screwing, for example, a through-hole has to be formed in the thickness direction of the members, through which a fastener, such as a screw, is inserted. However, the formation of a through-hole will degrade the appearance of the product because a head of the fastener will stick out of the outer face of the fiber-reinforced resin plate as the surface layer. Furthermore, since the fiber-reinforced resin plate at the surface layer is reinforced with carbon fibers or glass fibers, it is difficult to form a countersunk hole or the like there to embed the head of a screw.

Consequently, it would be desirable to provide an improved member for chassis that can handle the above-mentioned problems.

SUMMARY OF THE INVENTION

In accordance with a preferred embodiment of the present invention, a member for chassis includes a surface layer, a rear layer disposed inside of the surface layer in a thickness direction, and an intermediate layer disposed between the surface layer and the rear layer. Each of the surface layer and the rear layer includes a fiber-reinforced resin plate. The intermediate layer, which is made of a material that is compressible in the thickness direction, includes a fastening hole that penetrates through the surface layer, the intermediate layer and the rear layer, through which a fastener passes to fix the member for chassis to a member for attachment. The member also includes a cut line having a larger diameter than the fastening hole so as to surround the fastening hole and being disposed in the thickness direction of the surface layer.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
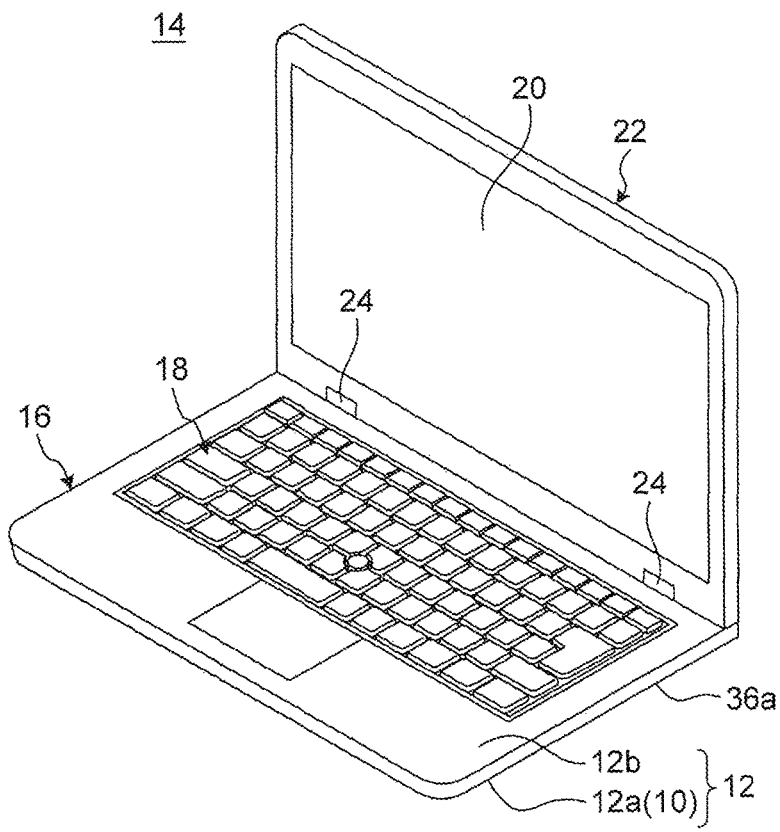
FIG. 1 is a perspective view of an electronic device in which a member for chassis according to a preferred embodiment of the present invention is incorporated.

Referring now to the drawings and in particular to FIG. 1, there is depicted a perspective view of an electronic device 14 having a chassis 12, which includes a member for chassis 10 according to a preferred embodiment of the present invention. The present embodiment shows the configuration as one example in which the chassis 12 made up of the member for chassis 10 is used as a body 16 of the electronic device 14 that is a laptop PC.

As shown in FIG. 1, the electronic device 14 includes the body (body chassis) 16 having a keyboard device 18, and a rectangular flat-plate like lid (display chassis) 22 having a display device 20, such as a liquid crystal display. The electronic device 14 is of a clam shell type in which the lid 22 is joined with the body 16 via left and right hinges 24 openably/closably.

The body 16 includes the chassis 12 having a rear-face cover 12a and a front-face cover 12b, and the chassis 12 internally stores various types of electronic components not illustrated, such as a board, an arithmetic processing unit, a hard disk device and a memory. The rear-face cover 12a is a cover member that covers a side face and a rear face of the body 16, and is made up of the member for chassis 10 according to the present embodiment. The front-face cover 12b is a cover member made of resin that covers the front face (top face) of the body 16, and the keyboard device 18 is disposed at a center thereof.

The lid 22 is electrically connected to the body 16 via a cable not illustrated passing through the hinges 24. The display device 20 is a liquid crystal display, for example.

Next, the configuration of the rear-face cover 12a of the body 16 and the member for chassis 10 making up the rear-face cover 12a are described in details.

Figure 2:
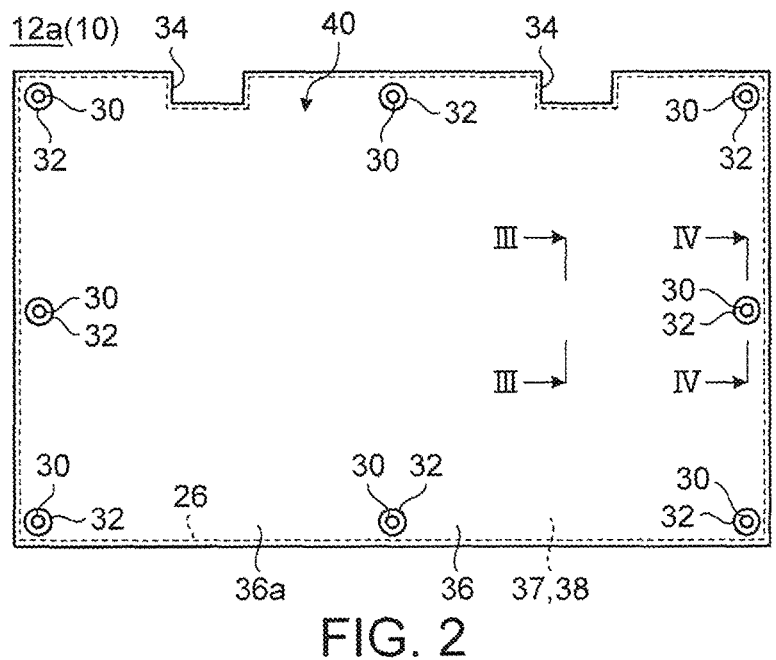
FIG. 2 is a plan view showing the configuration of a rear-face cover of the body.

The overall configuration of the rear-face cover 12a is described. FIG. 2 is a plan view showing the configuration of the rear-face cover 12a of the body 16, which is a view of the rear-face cover 12a as a bottom face of the chassis 12 from the outer face side.

As described above, the rear-face cover 12a is made up of the member for chassis 10. As shown in FIG. 2, the rear-face cover 12a is a panel-form cover member, in which a wall 26 to be a side face on four sides of the chassis 12 stands on the inner face side at the periphery. In the case of the present embodiment, the wall 26 is formed by injection-molding of thermoplastic resin to the outer edge portion of the member for chassis 10.

At appropriate positions of the periphery of the rear-face cover 12a, fastening holes 30 penetrate therethrough in the thickness direction, through which fasteners 28 (see is FIGS. 7 and 8), such as screws, bolts, or rivets, pass when the rear-face cover 12a is fastened and fixed to the front-face cover 12b. Around each of the fastening holes 30, a cut line 32 that is concentric with the fastening hole 30 and has a larger diameter is disposed. At a rear-end edge part of the rear-face cover 12a, a pair of left and right recesses 34, 34 are formed, in which a pair of left and right hinges 24, 24 are disposed.

In the present embodiment, the fastening holes 30 and the cut lines 32 are disposed at eight positions in total along the sides of the rear-face cover 12a, and the number and the positions of the fastening holes 30 and the cut lines 32 disposed may be changed as needed depending on the specifications or the like of the chassis 12.

Figure 3:
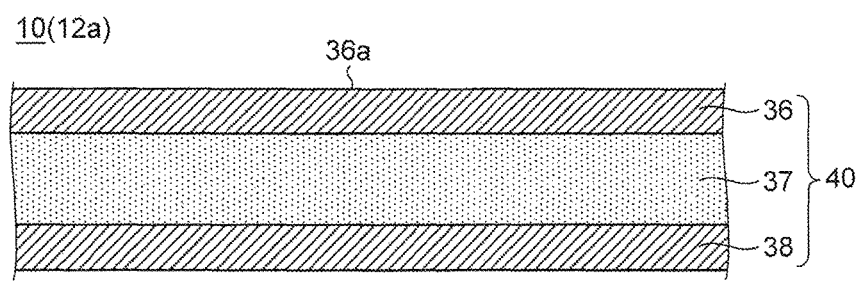
FIG. 3 is a cross-sectional view taken along a line III-III of FIG. 2.
Figure 4:
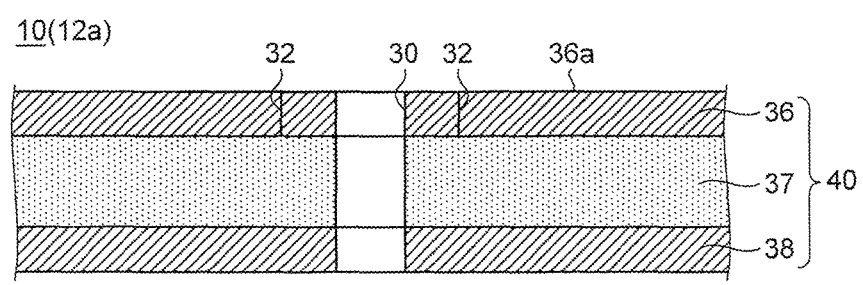
FIG. 4 is a cross-sectional view taken along a line IV-IV of FIG. 2.

Next, the configuration of the member for chassis 10 making up the rear-face cover 12a is described in details. FIGS. 3 and 4 are cross-sectional views in the thickness direction of the member for chassis 10, where FIG. 3 is a cross-sectional view taken along a line III-III of FIG. 2, and FIG. 4 is a cross-sectional view taken along a line IV-IV of FIG. 2.

As shown in FIGS. 2 to 4, the member for chassis 10 is configured so that the fastening holes 30 and the cut lines 32 are disposed at appropriate positions of a plate member 40 including the lamination of a surface layer 36, an intermediate layer 37 and a rear layer 38 stacked in this order.

The surface layer 36 is an outer-layer part that appears on the outer surface of the chassis 12, and a surface 36a thereof becomes a lower face of the chassis 12 (electronic device 14). The rear layer 38 is disposed inside of the surface layer 36 via the intermediate layer 37 in the thickness direction, which is an inner-layer part that appears to on the inner surface (inner face) of the chassis 12. The surface layer 36 and the rear layer 38 are each made up of a hard fiber-reinforced resin plate (prepreg plate) containing reinforcement fibers impregnated with thermosetting resin, such as epoxy resin, and have a thickness of about 0.25 mm, for example. In the present embodiment, carbon fiber-reinforced resin (CFRP), which includes carbon fibers as reinforcement fibers, is used. Instead of carbon fibers, other reinforcement fibers may be used, which include metal fibers such as stainless-steel fibers, inorganic fibers such as glass fibers, and other various types of materials.

The intermediate layer 37 is disposed between the surface layer 36 and the rear layer 38, which is a soft spacer member made of a compressible material in the thickness direction and has a thickness of about 0.5 mm, for example. Such an intermediate layer 37 leads to an increase in modulus of section of the plate member 40 in the thickness direction, and the plate member 40 can be lightweight and have a high-strength structure. The intermediate layer 37 is made up of a foamed layer including a foamed sheet such as polypropylene or of a fiber layer made of carbon fibers that are collected while having a compressible gap.

The fastening holes 30 are through-holes that penetrate through the surface layer 36, the intermediate layer 37 and the rear layer 38 (see FIG. 4). Each cut line 32 has a larger diameter than that of the corresponding fastening hole 30 so as to surround the fastening hole 30, and is an annular cutting plane formed along the thickness direction of the surface layer 36. In the case of the present embodiment, the cut line 32 is formed by cutting the surface layer 36 in the thickness direction from the surface 36a thereof across the entire thickness of the surface layer 36. The cut line 32 may have a depth that does not reach the intermediate layer 37 or a depth that reaches a part of the intermediate layer 37 close to the surface layer 36. Note here that, in order to secure the strength at the rear layer 38 during fastening with the fasteners 28 described later, the cut line 32 preferably has a depth that does not reach the rear layer 38.

Figure 5:
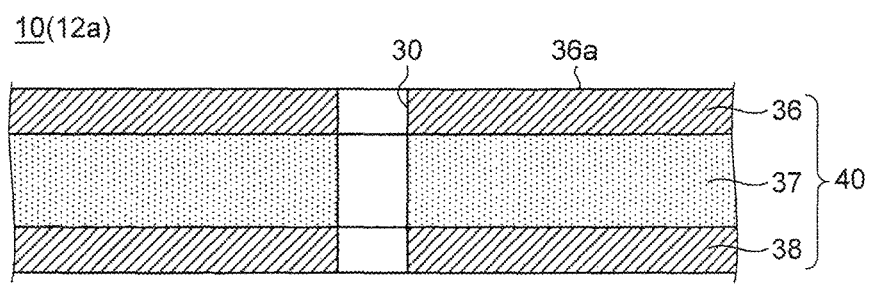
FIG. 5 is a cross-sectional view showing the state where a fastening hole is formed in a plate member.
Figure 6:
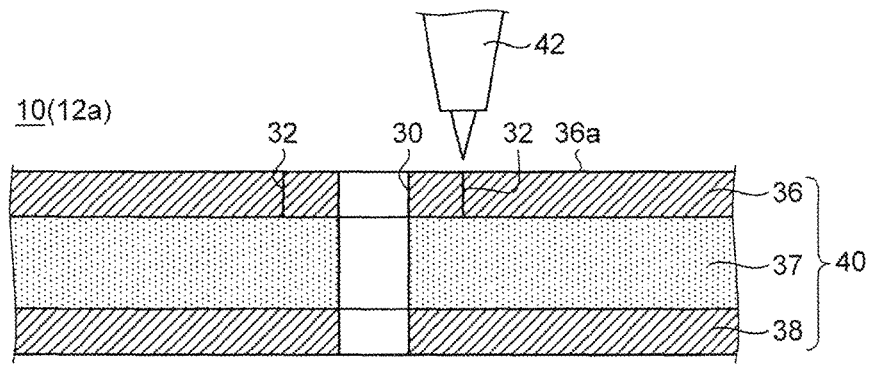
FIG. 6 is a cross-sectional view showing the state where a cut line is formed in the plate member of FIG. 5.

Next, the following describes one example of a method for manufacturing the member for chassis 10. FIGS. 5 and 6 are cross-sectional views schematically showing one example of the method for manufacturing the member for chassis 10 according to the present embodiment.

When the member for chassis 10 is to be manufactured, a pair of flat fiber-reinforced resin plates to form the surface layer 36 and the rear layer 38 are firstly prepared, and a flat intermediate layer 37 is sandwiched between them, followed by pressing them as a whole in the stacking direction, whereby the plate member 40 is formed (see FIG. 3).

Subsequently as shown in FIG. 5, the fastening holes 30 are formed, which are through-holes in the thickness direction, at required positions of the plate member 40. The fastening holes 30 may be formed by laser processing or mechanical processing, for example.

Next as shown in FIG. 6, a cut line 32 having a larger diameter than that of the corresponding fastening hole 30 is formed around the fastening hole 30 to have a certain gap therebetween. The cut line 32 has to have an inner diameter allowing a head 28a of the fastener 28, which is to be inserted into the fastening hole 30, to be embedded therein (see FIG. 8). The cut line 32 may be formed by a cutting step through laser application in a circular direction performed once or a plurality of times using a laser processor 42, for example. Thereby the member for chassis 10 that is the plate member 40, at appropriate positions of which the fastening holes 30 and the cut lines 32 have been formed, is completed as shown in FIGS. 2 to 4. Since the cut lines 32 are formed by the laser processor 42, the cutting width of the cut lines 32 can be minimized, and burrs and chips can be avoided.

Note here that the order of the step of forming the fastening holes 30 shown in FIG. 5 and the step of forming the cut lines 32 shown in FIG. 6 may be reversed. However, when the fastening holes 30 are formed after the cut lines 32, the fastening holes 30 also are formed by laser processing preferably. This is because, if a fastening hole 30 is formed by mechanical processing using a turning machine, for example, inside of the cut line 32, then the inside part of the cut line 32 at the surface layer 36 will rotate together with the machine tool, which leads to difficulty to form a smooth through-hole.

Figure 7:
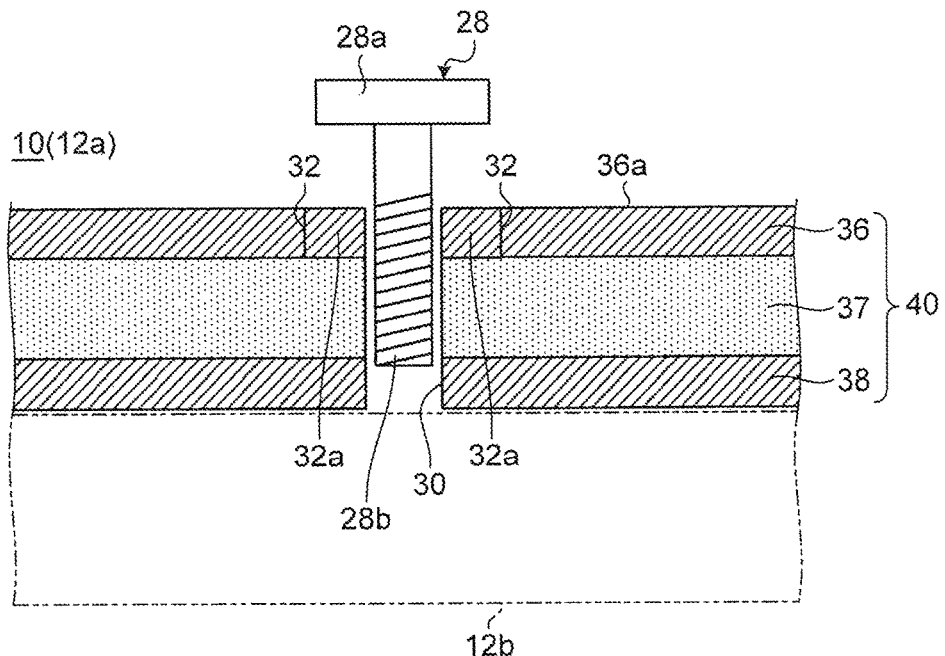
FIG. 7 is a cross-sectional view showing the state where a fastener is inserted into the fastening hole of the member for chassis of FIG. 6.
Figure 8:
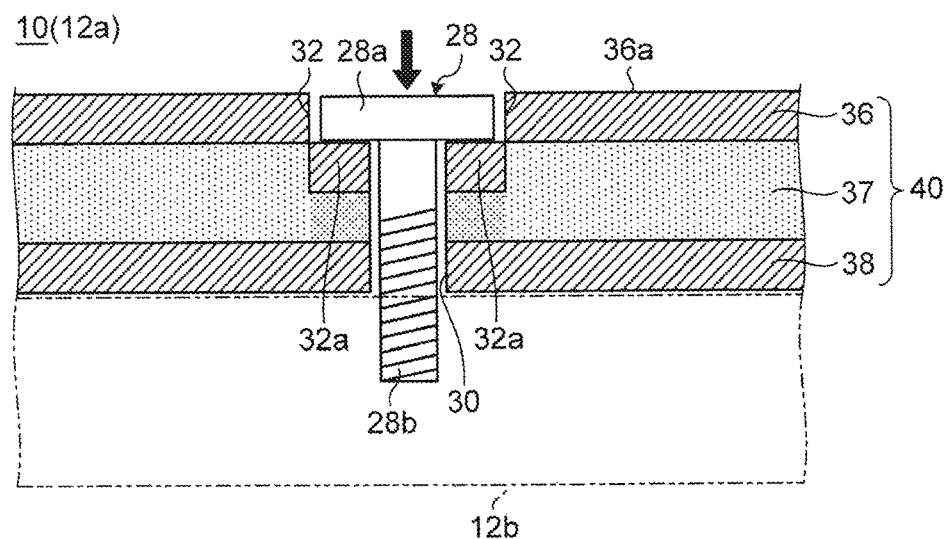
FIG. 8 is a cross-sectional view showing the state where the fastener is fastened from the state of FIG. 7 in order to fix the member for chassis to the member for attachment.

Next the following describes a method for fastening to fix the thus prepared member for chassis 10 to a member for attachment. FIGS. 7 and 8 are cross-sectional views schematically showing one example of a method for fastening to fix the member for chassis 10 prepared as shown in FIG. 6 to the front-face cover 12b as a member for attachment.

When the member for chassis 10 (rear-face cover 12a) is fixed to the member for attachment (front-face cover 12b), as shown in FIG. 7, the member for chassis 10 is firstly brought into contact with the front-face cover 12b as the member for attachment so that the fastening holes 30 coincide with not-illustrated screw holes of the front-face cover 12b, and then a thread part 28b of the fastener 28 is inserted into the fastening hole 30 from the surface 36a side of the surface layer 36.

Subsequently as shown in FIG. 8, the thread part 28b of the fastener 28 is screwed together with the not-illustrated screw hole of the front-face cover 12b by means of a tool such as a screw driver not illustrated. Then, the head 28a of the fastener 28 traveling toward the rear layer 38 in the thickness direction of the member for chassis 10 presses down the inside part of the cut line 32, i.e., an annular cut end 32a defined between the cut line 32 and the fastening hole 30, and the cut end 32a functions as a washer, so that the intermediate layer 37 is compressed at a part between the cut end 32a and the rear layer 38. At this time, when the cut line 32 is formed so as to cut the surface layer 36 across the entire thickness, the cut end 32a can be pressed down smoothly with the fastener 28, and so burrs and chips can be prevented reliably.

Figure 9:
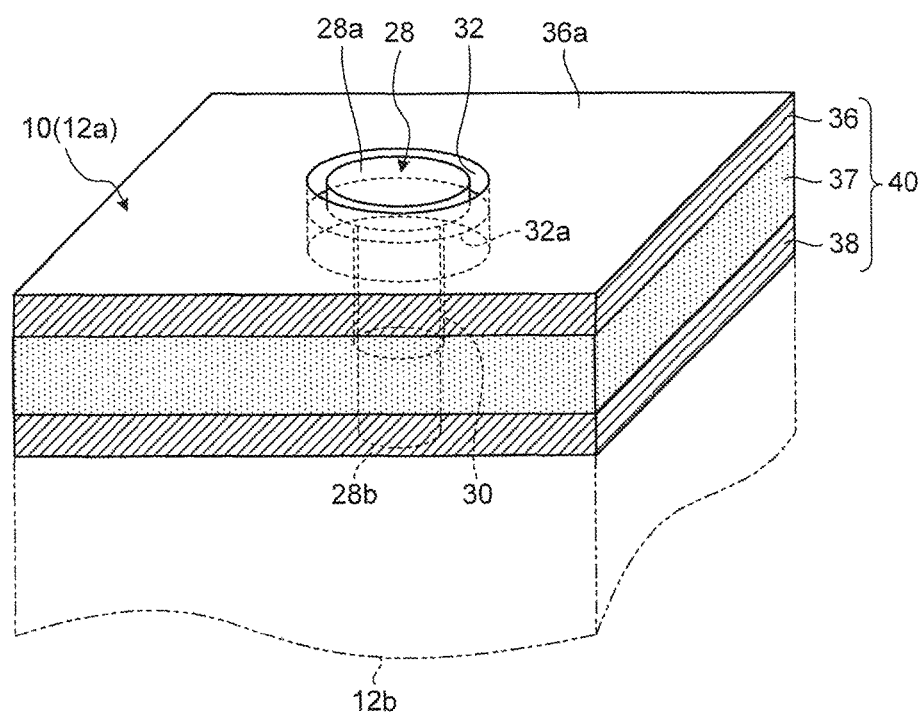
FIG. 9 is a perspective view showing the state where the member for chassis is fixed to the member for attachment.

As a result, as shown in FIGS. 8 and 9, the head 28a of the fastener 28 is embedded from the surface 36a of the surface layer 36 inside of the cut line 32, so that a fastening structure is configured to fix the member for chassis 10 and the front-face cover 12b in the state where the cut end 32a of the surface layer 36, the compressed intermediate layer 37 and the rear layer 38 are sandwiched between the lower face of the head 28a and the front-face cover 12b. Thereby, the member for chassis 10 (rear-face cover 12a) and the member for attachment (front-face cover 12b) can be fixed reliably.

As described above, the member for chassis 10 according to the present embodiment includes the surface layer 36, the rear layer 38 disposed inside of the surface layer 36 in the thickness direction, and the intermediate layer 37 disposed between the surface layer 36 and the rear layer 38. The surface layer 36 and the rear layer 38 each include a fiber-reinforced resin plate, and the intermediate layer 37 is made of a material that is compressible in the thickness direction. The member for chassis 10 includes the fastening holes 30 that penetrate through the surface layer 36, the intermediate layer 37 and the rear layer 38, through which the fasteners 28 pass to fix the member for chassis 10 to the member for attachment, and the cut lines 32 each having a larger diameter than that of the corresponding fastening hole 30 so as to surround the fastening hole 30 and being disposed in the thickness direction of the surface layer 36.

In the method for manufacturing the member for chassis 10 according to the present embodiment, the surface layer 36 including a fiber-reinforced resin plate, the intermediate layer 37 made of a material that is compressible in the thickness direction, and the rear layer 38 including a fiber-reinforced resin plate are stacked in this order to form the plate member 40. Then the fastening holes 30 are formed so as to penetrate through the surface layer 36, the intermediate layer 37 and the rear layer 38 of this plate member 40, and the cut lines 32 each having a larger diameter than that of the corresponding fastening holes 30 and surrounding the fastening hole 30 is formed in the thickness direction of the surface layer 36, thus forming the member for chassis 10.

Therefore when such a member for chassis 10 is fixed to the member for attachment, the fasteners 28 such as screws are inserted into the fastening holes 30 from the surface layer 36 side for fastening, whereby the head 28a of each fastener 28 presses down the inside part of the cut line 32 while compressing the intermediate layer 37. Thereby, the chassis 12 having a fastening structure with high strength can be configured so that, while the head 28a of the fastener 28 is embedded inside of the surface layer 36, the cut end 32a of the surface layer 36 and the rear layer 38 are sandwiched between this head 28a and the member for attachment, and this can avoid degradation in quality in appearance of the electronic device 14 as the product, which would occur if a head 28a of the fastener 28 sticks out of the outer surface of the chassis 12. Further, only the fastening holes 30 as through-holes and the cut lines 32 surrounding them are formed in the member for chassis 10, and there is no need to form a countersunk hole or the like to embed the head 28a of the fastener 28 in the fiber-reinforced resin plate of the surface layer 36 and to perform injection-molding of a resin material at the fastening part of the fastener 28 as in the above-mentioned conventional configuration. As a result the manufacturing cost and the manufacturing efficiency can be improved.

In the fastening structure according to the present embodiment, the fasteners 28 are inserted into the fastening holes 30 penetrating through the surface layer 36, the intermediate layer 37 and the rear layer 38 of the member for chassis 10, and the cut end 32a at a part of the surface layer 36 surrounding each of the fastening holes 30 and the rear layer 38 are sandwiched between the head 28a of the corresponding fastener 28 and the member for attachment so as to compress the intermediate layer 37. In this state, the member for chassis 10 is fixed to the member for attachment. That is, since the surface layer 36 (cut end 32a) and the rear layer 38 each including a fiber-reinforced resin plate are sandwiched between the head 28a of the fastener 28 and the member for attachment for fastening, high fastening strength can be achieved. At this time, since the cut lines 32 have a depth that does not reach the rear layer 38 at least, the fastening strength with the fasteners 28 is not degraded.

The present invention is not limited to the above-mentioned embodiment, and can be freely changed without departing from the spirit of the present invention specified in the claims.

For instance, in the above embodiment, the member for chassis 10 is used as the rear-face cover 12a of the chassis 12 in the body 16 making up the electronic device 14. Instead, the member for chassis 10 may be used for the front-face cover 12b or the lid 22. The member for chassis 10 further can be used as a member for chassis of various types of electronic devices, such as a desktop PC, a tablet PC, a smartphone and a mobile phone.

The above embodiment describes the three-layered member for chassis 10 having the surface layer 36, the intermediate layer 37 and the rear layer 38 as one example. Instead, the member for chassis may have a five or more-layered lamination structure including three or more fiber-reinforced resin plates between each of which the intermediate layer 37 is sandwiched, for example. For instance, in the case of a five-layered structure, the cut lines 32 may be formed from the surface 36a of the surface layer 36 to the first or the third fiber-reinforced resin plate.

As has been described, the present disclosure provides a member for chassis for electronic devices. When such a member for chassis is fixed to the member for attachment, a fastener, such as a screw, can be inserted into a fastening hole from a surface layer side for fastening, whereby the head of the fastener presses down the inside part of the cut line while compressing the intermediate layer. Thereby, the chassis having a fastening structure with high strength can be configured so that, while the head of the fastener is embedded inside of the surface layer, the cut end of the surface layer and the rear layer are sandwiched between this head and the member for attachment, and this can avoid degradation in the appearance of the electronic device.

Otherwise, the head of the fastener would have been sticking out of the outer surface of the chassis. Furthermore, only the fastening hole as a through-hole and the cut line surrounding it are formed in the member for chassis, and there is no need to form a countersunk hole or the like in the fiber-reinforced resin plate and to perform injection-molding of a resin material at the fastening part of the fastener.

While the disclosure has been particularly shown and described with reference to a preferred embodiment, it will be understood by those skilled in the art that various changes in form and detail may be made therein without departing from the spirit and scope of the disclosure.

What is claimed is:

1. A chassis cover comprising:
   a first layer;
   a second layer;
   an intermediate layer disposed between said first layer and said second layer, wherein said first layer and said second layer each including a fiber-reinforced resin plate, and said intermediate layer is made of a compressible material;
   a fastening hole that penetrated through said first layer, said intermediate layer and said second layer, wherein said fastening hole is configured to receive a fastener; and
   a cylindrical cut line disposed in said first layer in a thickness direction orthogonal to a surface of said first layer, wherein said cylindrical cut line has a larger diameter than said fastening hole in order to surround said fastening hole wherein said cylindrical cut line allows said fastener to depress a ring-shaped piece of said first layer into said intermediate layer such that a surface of said fastener is flush with said surface of said first layer.

2. The chassis cover of claim 1, wherein said cylindrical cut line cuts across the entire thickness of said first layer.

3. The chassis cover of claim 1, wherein said ring-shaped piece remains to be located in said first layer until after being pushed by said fastener into said intermediate layer.

4. The chassis cover of claim 1, wherein said cylindrical cut line is formed by laser processing.

5. An electronic device comprising:
   a display chassis having a display device; and
   a body chassis having a keyboard device, wherein said body chassis includes:
      a first layer;
      a second layer;
      an intermediate layer disposed between said first layer and said second layer, wherein said first layer and said second layer each including a fiber-reinforced resin plate, and said intermediate layer is made of a compressible material;
      a fastening hole that penetrated through said first layer, said intermediate layer and said second layer, wherein said fastening hole is configured to receive a fastener; and
      a cylindrical cut line disposed in said first layer in a thickness direction orthogonal to a surface of said first layer, wherein said cylindrical cut line has a larger diameter than said fastening hole in order to surround said fastening hole wherein said cylindrical cut line allows said fastener to depress a ring-shaped piece of said first layer into said intermediate layer such that a surface of said fastener is flush with said surface of said first layer.

6. The electronic device of claim 5, wherein said, cylindrical cut line cuts across the entire thickness of said first layer.

7. The electronic device of claim 5, wherein said cylindrical cut line allows said fastener to depress a ring-shaped piece of said first layer into said intermediate layer such that a surface of said fastener is flush with said surface of said first layer.

8. The electronic device of claim 7, wherein said ring-shaped piece remains to be located in said first layer until after being pushed by said fastener into said intermediate layer.

9. The electronic device of claim 5, wherein said cylindrical cut line is formed by laser processing.

10. A method comprising:
    forming a chassis cover by placing an intermediate layer made of a compressible material between a first layer having a fiber-reinforced resin plate and a second layer having a fiber-reinforced resin plate;
    forming a fastening hole that penetrates through said first layer, said intermediate layer and said second layer of said chassis cover; and
    providing a cylindrical cut line surrounding said fastening hole in said first layer in a thickness direction orthogonal to a surface of said first layer, wherein said cylindrical cut line has a larger diameter than said fastening hole in order to surround said fastening hole, wherein said method further includes placing a fastener into said fastening hole to depress a ring-shaped piece of said first layer along said cylindrical cut line into said intermediate layer such that a surface of said fastener is flush with said surface of said first layer, and wherein said ring-shaped piece remains to be located in said first layer until after being pushed by said fastener into said intermediate layer.

11. The method of claim 10, wherein said providing further includes providing said cylindrical cut line via laser processing.

12. The method of claim 10, wherein said cylindrical cut line cuts across the entire thickness of said first layer.

* * * * *